United States Patent
Spielman et al.

(10) Patent No.: US 6,560,318 B1
(45) Date of Patent: May 6, 2003

(54) ARRANGEMENT FOR MANAGING NOTIFICATION PREFERENCES FOR NOTIFICATION DELIVERY MESSAGES IN AN IP-BASED NOTIFICATION ARCHITECTURE

(75) Inventors: Brenda Gates Spielman, Charlottesville, VA (US); Geetha Ravishankar, Glen Allen, VA (US); Govind Pande, Richmond, VA (US); Satish Joshi, Glen Allen, VA (US); Nagendran Parasu, Richmond, VA (US); Robert James Lockwood, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 09/656,840

(22) Filed: Sep. 7, 2000

(51) Int. Cl.⁷ .............................. H04M 1/64; H04M 3/00
(52) U.S. Cl. ................ 379/88.12; 379/67.1; 379/88.07; 379/88.13; 379/88.17; 379/88.22; 379/908
(58) Field of Search .............................. 379/67.1, 88.07, 379/88.11, 88.12, 88.13, 88.17, 88.22, 88.75, 265.09, 900, 901, 908

(56) References Cited

U.S. PATENT DOCUMENTS

| | | | |
|---|---|---|---|
| 4,837,798 A | | 6/1989 | Cohen et al. |
| 5,675,507 A | * | 10/1997 | Bobo, II ................ 364/514 R |
| 5,717,741 A | | 2/1998 | Yue et al. |
| 5,742,905 A | * | 4/1998 | Pepe et al. .................. 455/461 |
| 5,764,747 A | | 6/1998 | Yue et al. |
| 5,946,386 A | * | 8/1999 | Rogers et al. .............. 379/265 |
| 6,014,429 A | * | 1/2000 | LaPorta et al. .......... 379/88.15 |
| 6,233,317 B1 | * | 5/2001 | Homan et al. ........... 379/88.05 |
| 6,366,950 B1 | * | 4/2002 | Scheussler et al. ......... 709/206 |
| 6,430,272 B1 | * | 8/2002 | Maruyama et al. ...... 379/88.22 |
| 6,438,215 B1 | * | 8/2002 | Skladman et al. ......... 379/67.1 |

* cited by examiner

Primary Examiner—Allan Hoosain
(74) Attorney, Agent, or Firm—Leon R. Turkevich

(57) ABSTRACT

A notification architecture utilizes multiple processes configured for managing notification operations based on reception of SMTP-based messages within IMAP based message stores. The notification architecture includes a notification process, configured for receiving notification messages for respective subscribers from messaging sources according to a prescribed open protocol such as Internet Protocol. The notification process accesses subscriber profile information from an open protocol-based subscriber directory based on the received notification messages. The subscriber directory is controlled by a directory management process, configured for storing subscriber notification preference information in an open protocol-based subscriber directory (such as LDAP). The directory management process stores, as a first object class, notification attributes for respective notification types, each notification attribute specifying for the corresponding notification type a corresponding notification device tag. The notification device tag can include native device information usable to generate a message for a corresponding native notification device. The directory management process selectively stores, as a second object class, device attributes for a non-native notification device referenced by the notification device tag, one of the device attributes specifying service provider information for the non-native notification device. The directory management process also selectively stores, as a third object class, service provider attributes based on the service provider information specified in the device attributes. Hence, the storage of subscriber notification preference information using a hierarchal structure of multiple object classes provides a schema enabling an efficient management of relatively complex device information for different notification devices having respective protocols and service providers. Hence, notification subscribers having different notification devices in communication with respective service providers can store all notification preference information for all the different notification devices in a single, unified subscriber directory.

40 Claims, 7 Drawing Sheets

ARRANGEMENT FOR MANAGING NOTIFICATION PREFERENCES FOR NOTIFICATION DELIVERY MESSAGES IN AN IP-BASED NOTIFICATION ARCHITECTURE

BACKGROUND OF THE INVENTION

1. Field of the Invention

The present invention relates to message notification systems configured for sending a notification message to a subscriber having received a message according to subscriber notification preferences, and subscriber directory systems configured for storing the subscriber notification preferences.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

For example, existing messaging systems such as voice mail messaging systems rely on a proprietary notification system that has limited adaptability to expanded notification schemes. For example, the simplest type of notification system involves a message waiting indicator on a telephone connected to a private branch exchange (PBX), where the PBX asserts a message waiting indicator signal in response to receiving a proprietary command from a connected voice mail system. A more advanced system may initiate a page to a subscriber's pager indicating reception of the stored voice message. In each of these cases, however, the notification process necessarily relies on the proprietary features of the PBX and the associated voice mail system.

Wireless based communications system have voice messaging systems that notify a wireless subscriber via his or her wireless telephone of a stored voicemail message. Such notification systems are beneficial in cases where the subscriber was making another call on his or her wireless telephone, or if the subscriber's wireless telephone was previously unavailable due to being turned off or outside a service area. Such wireless based communications systems, however, rely on the proprietary features of the wireless indications system in order to notify the wireless subscriber.

Short Message Services (SMS) have been implemented in wireless telephone communications systems as a way to send a message to a subscriber's cellular phone to notify the subscriber that he or she has received a new voice mail. A messaging server, also referred to as a Short Message Service Center (SMSC), is configured for receiving a notification message from a messaging source according to Short Message Peer to Peer Protocol (SMPP). The messaging source may be, for example, a voice mail system, a paging system, or an e-mail interface resident within the wireless telephone communications system. The SMSC, in response to receiving the notification message from the messaging source, transmits a short message to the cellular phone based on the destination telephone number specified within the notification message. However, this arrangement still provides only limited flexibility in enabling different sources to send a notification to a cellular phone. Hence, the above-described arrangement still lacks sufficient flexibility and scalability to enable messaging subscribers to select the means for notification.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store. However, the problem still remains that there exists several different types of notification devices, such as a pager, a phone indicator light, stutter dial tone, facsimile, and telephone. Moreover, for each message that enters a messaging store, one or more subscribers may need to be notified over one or more different notification devices. Finally, the different types of notification devices have respective notification protocols, increasing the complexity in designing a notification source for sending a notification to different types of notification devices.

Commonly-assigned, copending application Ser. No. 09/629,052, filed Jul. 31, 2000, entitled Arrangement for Common-Format Notification Delivery Messages Based on Notification Device Type in an IP-based Notification-Architecture, the disclosure of which is incorporated in its entirety herein by reference, discloses a notification architecture that utilizes multiple processes configured for managing notification operations based on reception of SMTP-based messages within IMAP based message stores. The notification architecture includes a notification process, configured for receiving notification messages for respective subscribers from messaging sources according to Internet Protocol. The notification process accesses subscriber profile information from an open protocol-based subscriber directory (such as LDAP) based on the received notification messages. The notification process determines, for each received notification message, the subscriber's notification preference based on the accessed profile information, and selectively outputs a notification delivery message according SMTP protocol to at least one notification delivery process within the notification architecture based on the subscriber's notification preference. The notification process may have access via the prescribed open protocol to multiple notification delivery processes, each configured for outputting a notification to a subscriber's notification device according to a corresponding device protocol. Hence, subscribers may be notified of events according to their respective preferences, including subscriber device type, or time of notification. The notification process also generates the notification delivery message using selected portions of the notification information and subscriber information based on the notification device type, providing a common format for device specific notification messages. Hence, each notification delivery process can receive device specific notification messages according to a common format from the notification process or another external process.

An important consideration in effective deployment of the notification architecture illustrated in the above-incorporated application Ser. No. 09/629,052 is that the subscriber's notification preference is stored and retrieved in the subscriber directory in a manner that enables flexible selection of different notification devices. For example, a service provider configured for serving subscriber devices (i.e., local devices) assigned within a service provider network may have sufficient device information for sending a notification to the local device. However, a notification subscriber may wish to use a notification device that is not a local device, but rather is assigned to a different provider network (e.g., a different SMS network or paging provider). Hence, a subscriber directory may be incapable of providing notification information for non-local devices due to the nature in which the subscriber preference information and device information are stored and managed in the subscriber directory.

SUMMARY OF THE INVENTION

There is a need for an arrangement that provides an open standards-based architecture for delivering notification for unified messaging systems over a broad range of notification devices, independent of the service provider serving the notification devices.

There also is a need for an arrangement that provides a scalable notification architecture that can manage subscriber notification preferences for notification via subscriber-selected devices in a flexible and scalable manner.

These and other needs are attained by the present invention, where a directory management process, configured for storing subscriber notification preference information in an open protocol-based subscriber directory (such as LDAP), stores, as a first object class, notification attributes for respective notification types, each notification attribute specifying for the corresponding notification type a corresponding notification device tag. The notification device tag can include native device information usable to generate a message for a corresponding native notification device. The subscriber management process selectively stores, as a second object class, device attributes for a non-native notification device referenced by the notification device tag, one of the device attributes specifying service provider information for the non-native notification device. The subscriber management process also selectively stores, as a third object class, service provider attributes based on the service provider information specified in the device attributes. Hence, the storage of subscriber notification preference information using a hierarchal structure of multiple object classes provides a schema enabling an efficient management of relatively complex device information for different notification devices having respective protocols and service providers. Hence, notification subscribers having different notification devices in communication with respective service providers can store all notification preference information for all the different notification devices in a single, unified subscriber directory.

One aspect of the present invention provides a method in a subscriber directory of storing subscriber notification preference information. The method includes storing a first object class of notification attributes for respective notification types, each notification attribute specifying for the corresponding notification type a corresponding notification device tag for notification to a corresponding notification device. The method also includes selectively storing a second object class of device attributes for at least one of the notification devices based on a prescribed condition of the at least one notification device, the second object class of device attributes specifying information necessary for generating a notification message to the corresponding notification device, the corresponding notification device tag for the at least one notification device referencing the corresponding second object class. The selective storage of a second object class of device attributes enables the subscriber notification preference information stored in the subscriber directory to be organized in a flexible manner that utilizes additional object classes based on the level of specificity required for sending a notification to a prescribed notification device. Hence, the notification device tag for a native notification device may require only a device address that is recognized by the notification processes accessing the subscriber directory; if additional information is necessary for accessing the notification device, for example if proprietary protocols are used, the second object class (and additional object classes) may be added to provide sufficient information for gene ration of the notification message for the corresponding notification device. Hence, the subscriber directory is able to store subscriber notification preference information for all notification devices, independent of the service provider serving the notification devices.

Another aspect of the present invention provides a server configured for storing subscriber notification preference information in a subscriber directory, the server including an open-protocol network interface configured for receiving a request from a requesting resource according to an open-network protocol, and a directory management process. The directory management process is configured for storing, according to the request, the subscriber notification preference information in the subscriber directory as a first object class of notification attributes for respective notification types, and selectively as a second object class of device attributes for at least one of the notification devices. Each notification attribute specifies for the corresponding notification type a corresponding notification device tag for notification to a corresponding notification device, the directory management process'selectively storing the second object class based on a prescribed condition of the at least one notification device, the second object class of device attributes specifying information necessary for generation of a notification message to the corresponding notification device, the corresponding notification device tag for the at least one notification device referencing the corresponding second object class.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for storage in a subscriber directory of subscriber notification preference information using a hierarchal structure of multiple object classes, enabling an efficient management of relatively complex device information for different notification devices having respective protocols and service providers. Hence, notification subscribers having different notification devices in communication with respective service providers can store all notification preference information for all the different notification devices in a single, unified subscriber directory. The storage of all notification preference information enables any notification process to access the subscriber directory using an open protocol, such as LDAP protocol, independent of the device protocol or the service provider used by the notification subscriber. Hence, notification systems can access the same LDAP-based subscriber directory for all of the subscriber's notification preference information, regardless of whether the notification is based on a received voice message, a received e-mail, received fax, etc. A description will be provided of the notification architecture that utilizes open network protocols, followed by a description of the arrangement for storing subscriber notification preferences using the hierarchal structure of multiple object classes.

Figure 1:
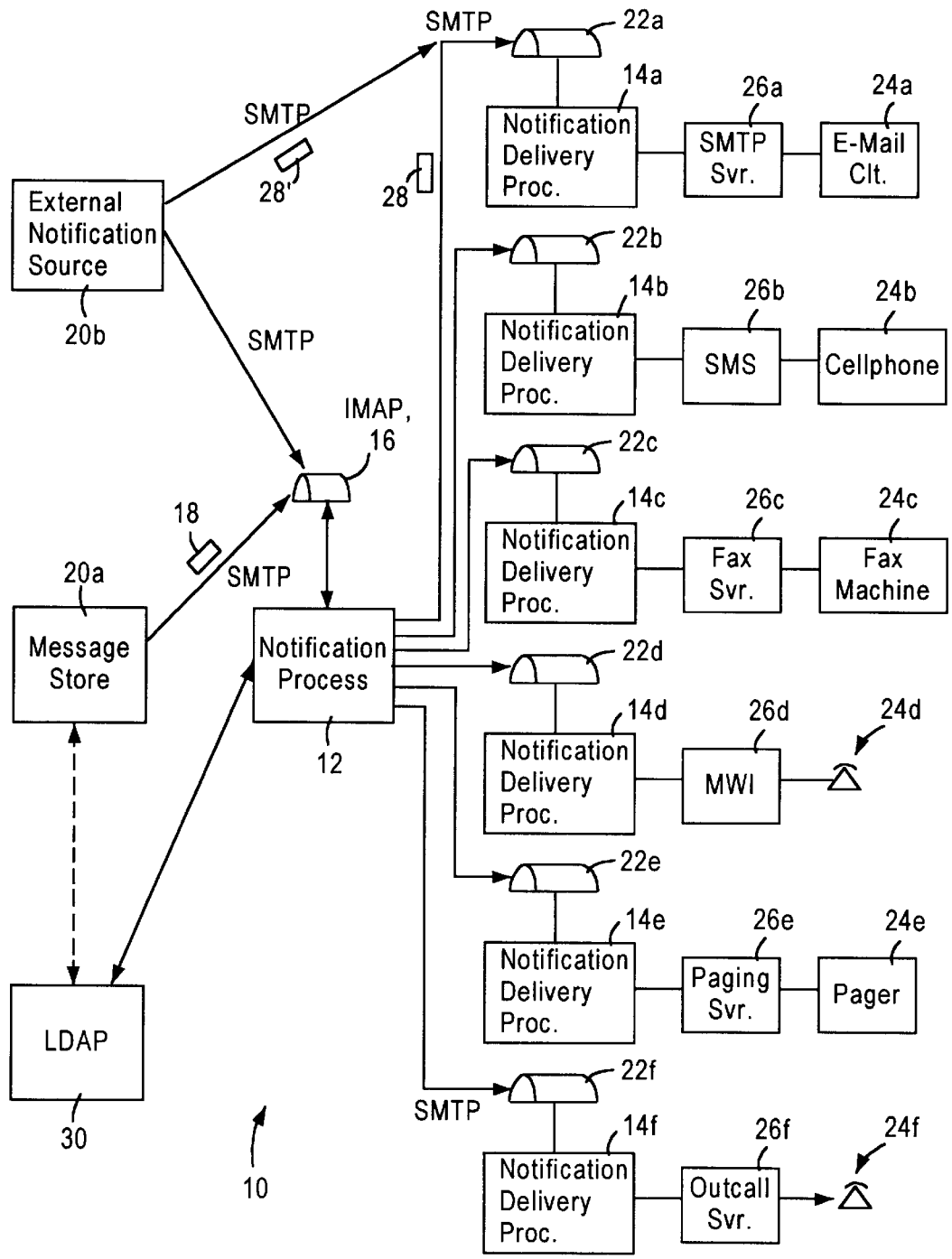
FIG. 1 is a block diagram illustrating deployment of a notification system for use with a unified messaging system according to an embodiment of the present invention.

FIG. 1 is a block diagram illustrating an architecture that provides unified notification services via an IP network according to an embodiment of the present invention. The notification system 10 includes a notification process 12 and multiple notification delivery processes 14. The notification process 12 has an associated SMTP-based mailbox 16, also referred to as the primary mailbox, configured for receiving generic notification messages 18 from notification sources 20, such as a unified messaging system 20a or an external notification source 20b. An exemplary implementation of the unified messaging system 20a is the commercially available Cisco Unified Open Network Exchange (Cisco uOne) (Products UONE-FOUND 4.1S, and UONE-VOICEMSG4.1S) from Cisco Systems, Inc. An example of the external notification source 20b may be an e-mail server configured for automatically generating e-mail messages in response to a prescribed detected events, for example execution of a prescribed stock transaction, shipment of a customer order, etc.

Each notification delivery process 14 also has a corresponding SMTP based mailbox 22, referred to as a secondary mailbox, configured for receiving a corresponding notification delivery message 28. As described in detail below, each SMTP based mailbox 22 is configured for receiving according to SMTP protocol a corresponding notification delivery message 28 that specifies selected notification information to be utilized for notification according to a corresponding device-specific protocol. Although the notification delivery message 28 is typically sent by the notification process 12 according to accessed subscriber notification preferences, described below, the notification delivery message 28' may also be sent independently by the external notification service 20b if properly configured to supply the appropriate notification information according to the device-specific protocol.

Each notification delivery process 14 is configured for delivering a notification to a subscriber's notification device 24, according to a corresponding device protocol, based on reception of a notification delivery message 28 in its corresponding mailbox 22. For example, the notification delivery process 14a is configured for sending an SMTP-based notification to an e-mail client 24a using an SMTP server 26a for distribution of the selected notification information according to the protocol of the e-mail client 24a. Similarly, the notification delivery process 14b is configured for outputting an SMS-based message to the SMS server 26b for delivery to the subscriber's cellphone 24b. The notification delivery process's 14c is configured for sending an outgoing facsimile transmission to a subscriber's fax machine 24c using a fax server 26c, and the notification delivery process 14d is configured for sending a command to the message waiting indicator server 26d for asserting a message waiting light on a subscriber's telephone 24d. The notification delivery process 14e is configured for sending a paging command to a paging server 26e for delivery of a wireless page to a subscriber's pager 24e, and the notification delivery process 14f is configured for requesting an outgoing call server 26d, for example a PBX or a voice over IP call controller, to place an outgoing call to a subscriber's telephone 24f used for notification (e.g., a home telephone for a secretary's telephone) in order to notify the subscriber of the event specified in the notification delivery message 28.

The notification process 12 is configured for outputting at least one notification delivery message 28 to a corresponding selected secondary mailbox 22 for delivery of a notification to the selected notification device 24 according to the corresponding protocol. In particular, the notification process 12 regularly polls the primary mailbox 16 for received messages from the message store 20a or the external notification service 20 band obtains the notification messages according to IMAP protocol. According to the disclosed embodiment, the message store 20a outputs a notification message to the primary mailbox 16 for each message received by the message store 20. The notification message 18, illustrated in FIGS. 2A and 2B, specifies at least one notification recipient within a subscriber information part and notification information within a message information part.

The notification process 12 generates the notification delivery message 28 and selects the notification delivery process 14 for delivery of notification information to the corresponding selected notification device 24 based on accessing subscriber attribute information that specifies the subscriber's notification preferences. In particular, the notification process 12, in response to detecting a notification message in the primary mailbox 16, accesses a subscriber directory 30 according to LDAP protocol for retrieval of subscriber attribute information for each notification recipient specified in the notification message 12.

In particular, the notification process 12 will determine, for each notification recipient specified in the notification message 18, whether the notification recipient is a notification subscriber (i.e., subscribes to the notification service), and the subscriber notification preferences for the notification recipient. For example, the subscriber notification preferences may specify that the notification subscriber prefers an e-mail notification at a first prescribed time, an SMS based message at a second prescribed time, and a message waiting indicator (MWI) at all times. Note that the prescribed times for different notification devices may overlap, causing the notification process 12 to generate multiple device-specific notification delivery message 28 for a single notification message 18.

Figure 2A:
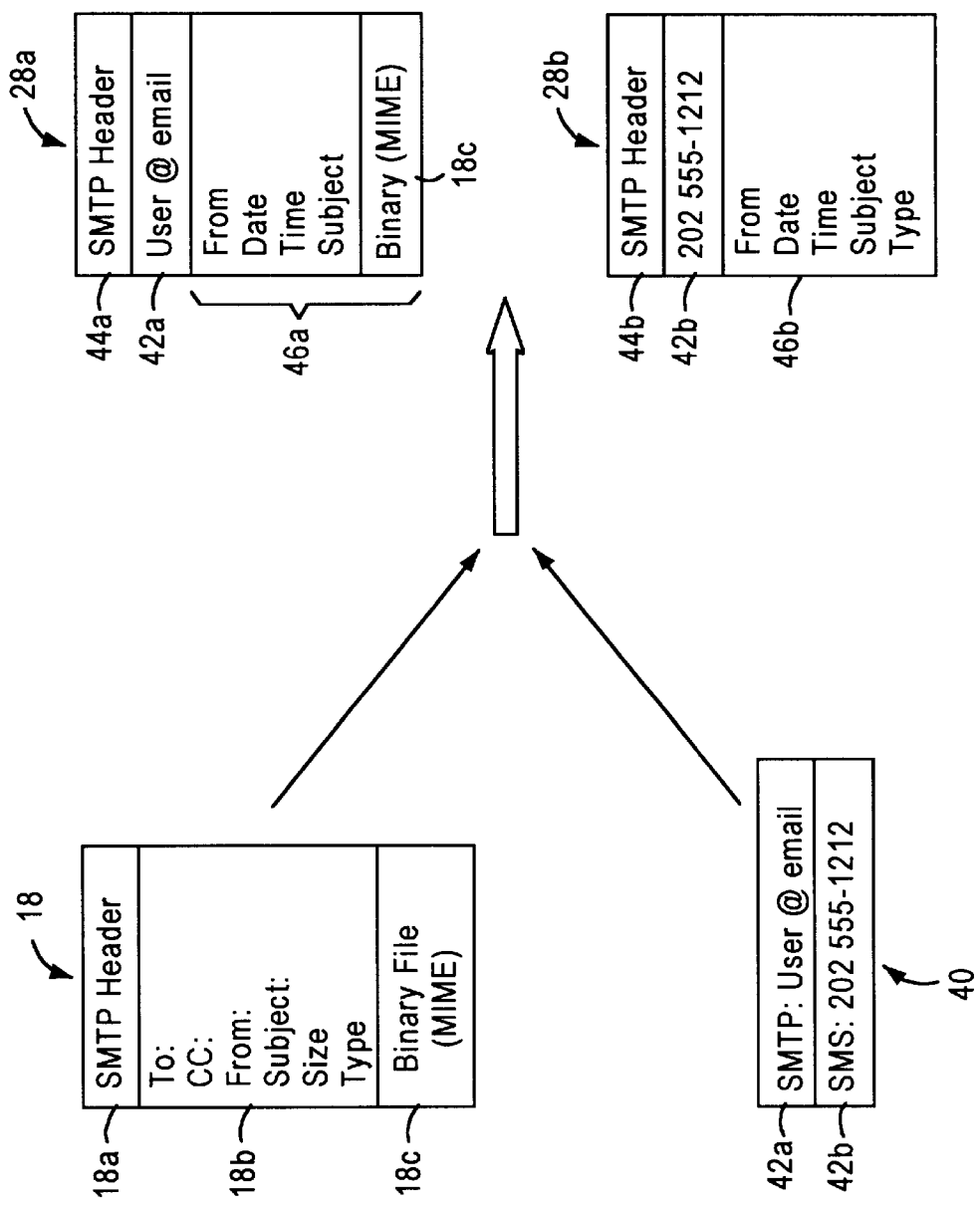
FIGS. 2A and 2B are diagrams illustrating the generation of a notification delivery message by the notification process of FIG. 1 using selected portions of notification information and retrieved subscriber notification preference information according to an embodiment of the present invention.
Figure 2B:
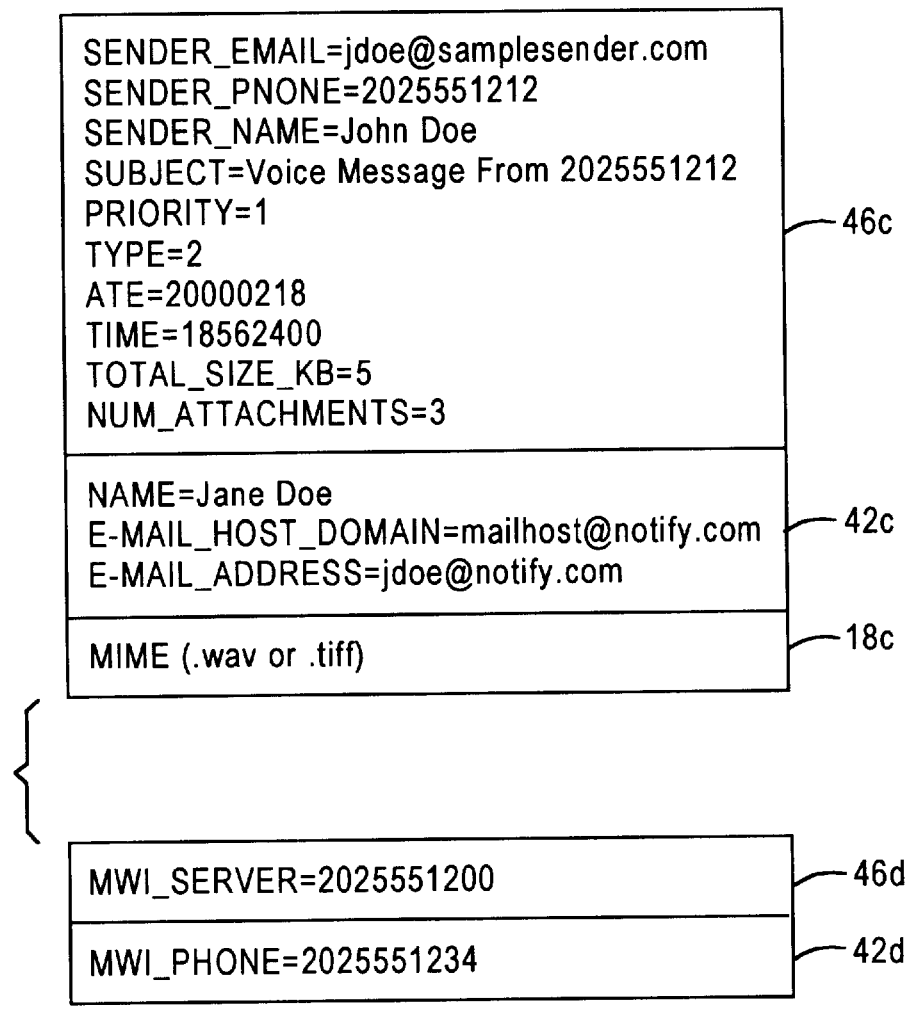

FIGS. 2A and 2B are a diagrams illustrating the generation of a notification delivery message 28 by the notification process of FIG. 1. FIG. 2A is an introductory illustration of the generation of the notification delivery message, and FIG. 2B is a diagram illustrating in further detail key value pairs selected for a notification delivery message 28 based on the notification device type.

As illustrated with respect to FIG. 2A, the notification process 12 retrieves the subscriber notification preferences 40 from the LDAP directory 30, for example the destination addresses 42 of the corresponding notification devices to be used for notification. For example, the subscriber notification preferences 40 include key value pairs that specify an e-mail address 42a for the e-mail client 24a, and a cellular telephone number 42b of the subscriber's cellphone 24b for SMS notification by the SMS server 26b.

Upon retrieval of the subscriber notification preferences 40, the notification process 12 generates at least one notification delivery message 28 that specifies the destination address 42 of a corresponding notification device 24 for the notification recipient, and at least a corresponding selected portion 46 of the notification information. In particular, the notification process 12 extracts selected portions of notification information 18b, 18c from the notification message 18 based on the notification device specified by the subscriber notification preference, and inserts the selected portions of the notification information into the notification delivery message 28. As illustrated in FIG. 2B, items that may be extracted from the received notification message 18 include: the sender's e-mail address, the sender's telephone number, the sender's name, the subject of the message, the priority of the message, the message type (e-mail, a fax, voice mail), the date and time of the message, the total size of the message, a text excerpt, and a MIME-encoded voice or fax attachment.

For example the notification process 12 may generate the notification delivery message 28a for the notification delivery process 14a by including an SMTP header 44a that specifies the destination e-mail address of the secondary mailbox 22a, the subscriber information (also referred to as the subscriber information part) illustrated as the destination address 42a of the e-mail client 24a, and notification information 46a (also referred to as the message information part) such as the source of the original message ("From"), date and time stamp, subject line, and a copy of the MIME encoded message attached as a binary file 18c in case the user wishes to play the message (in the case of a .wav file) or view the message (in the case of a .tiff file). In addition, the notification process 12 may generate a notification delivery message 28b for the notification delivery process 14b by including an SMTP header 44b that specifies the destination e-mail address of the secondary mailbox 22b the subscriber information illustrated as the telephone number of the cellphone 24b, and notification information 46b such as the source of the original message ("From"), date and time stamp, subject line, and message type. Note that the contents of the notification information 46b differs from the contents of the notification information 46a based on the relative capabilities of the notification devices 24b and 24a. Hence, the notification process 12 selects the notification information based on the capabilities of the notification device.

FIG. 2B illustrates in further detail the multiple key pairs that may be derived from the notification message 18 and the subscriber notification preferences 40 for generation of a device specific notification message according to an embodiment of the present invention. The format of the notification delivery message 28 is structured in the manner such that any application process can create or understand the notification delivery message 28.

In particular, the notification delivery message 28 is constructed as a multipart mixed message with two or more attachments. For example, the notification delivery message 28 includes a single message information attachment 46 and at least one subscriber information attachment 42 for each recipient of the original message. The multipart message may also include either an optional voice attachment or a facsimile attachment implemented as a MIME encoded binary file 18c.

The message information attachment 46 contains information about the original message that triggered the notification process, including key value pairs such as sender's e-mail, sender's phone, sender's name, subject, priority, message type, prescribed logging information, time, total size, and number of attachments. The subscriber information attachment 42 contains information about how to notify a subscriber, and lists information about specific subscriber and the notification preference for one or more devices. As illustrated in FIG. 2B the subscriber information 42c provides information on how to notify a subscriber using the e-mail client 24a as the device type; the subscriber information 42d illustrates the information necessary for leaving a message waiting indicator on a subscriber's telephone 24d.

Hence, the data in the message information attachment 46 and the subscriber information attachment 42 varies depending on the device type. For a pager, subscriber information would contain an e-mail address or information necessary to deliver the message to the paging provider 26e. For a cellphone, as illustrated in attachment 42b, the subscriber information would include details to contact the short message service 26b of the cellular phone provider.

Hence, the notification process 12 or the external notification source 20b generates a notification delivery message 28 having a prescribed format based on the notification device type.

Figure 3:
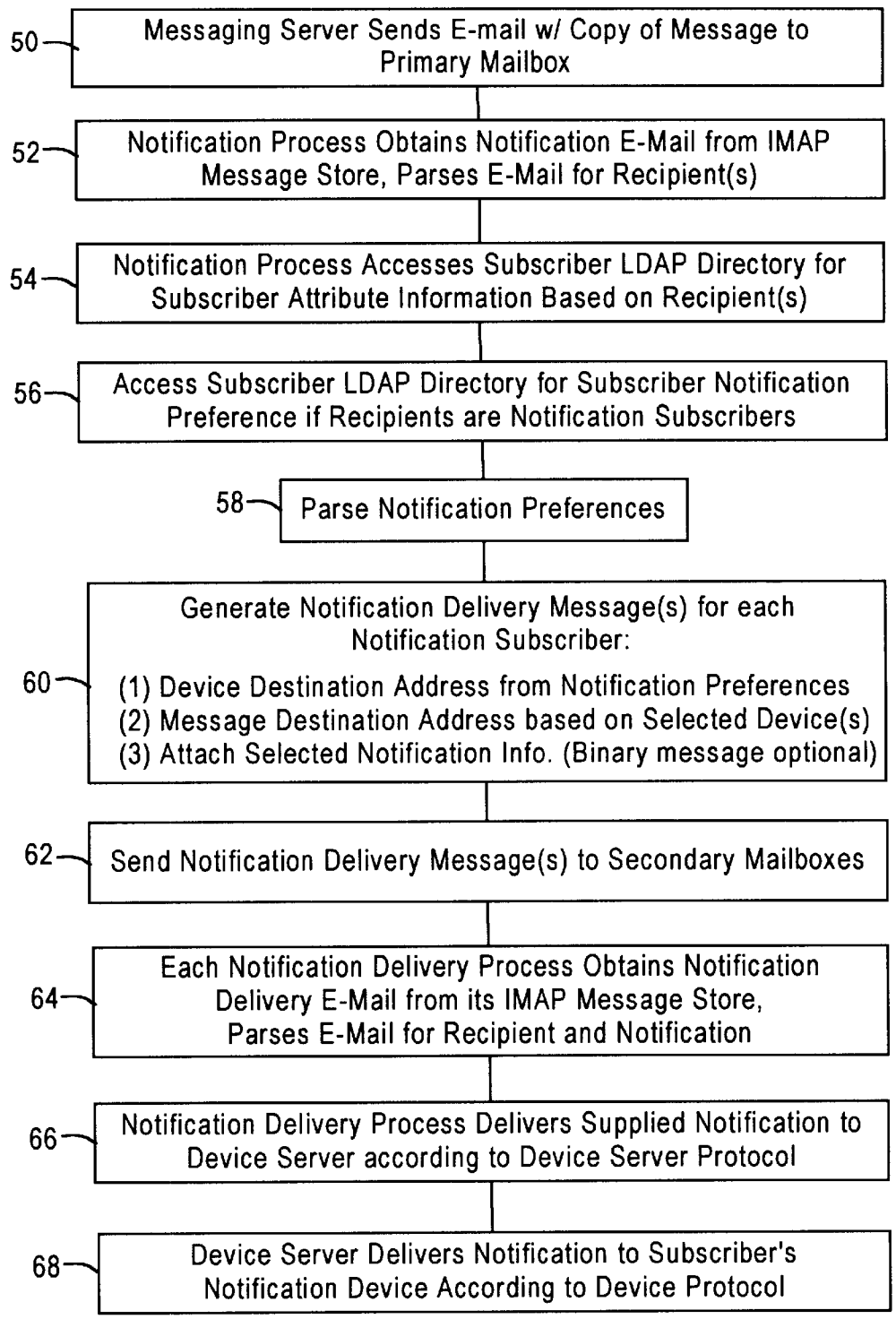
FIG. 3 is a diagram illustrating the notification method of the notification system of FIG. 1 according to an embodiment of the present invention.

FIG. 3 is a diagram illustrating the notification method by the notification system 10. The steps described in FIG. 3 can be implemented as executable code stored on a computer readable medium (e.g., a hard disk drive a floppy drive, a random access memory, a read only memory, an EPROM, a compact disc, etc.). In addition, the notification process 12 and the notification delivery processes 14 may be implemented as executable routines within a single server, or distributed across multiple servers.

In addition, the disclosed architecture has the advantage that each of the processes 12 and 14 are scalable across multiple servers for large-scale deployment as multiprocess systems, where each process communicates with another process by sending SMTP-based messages. For example, multiple notification processes 12 may be arranged to serve respective groups of subscribers, where a first notification process (e.g., 12a) forwards a received notification message 18 to the primary mailbox 16 of a second notification process (e.g., 12b) if the first notification process 12a does not serve the subscriber specified in the received notification message.

As shown in FIG. 3, the method begins in step 50 by the messaging server 20a or the external notification source 20b by sending the notification message 18 with a copy of the stored message (shown in FIG. 2 as portions 18b and 18c) to the primary mailbox 16 of the notification process 12. The notification process 12 regularly polls the primary mailbox 16, implemented within the IMAP message store, and obtains the notification message 18 in step 52 according to, IMAP protocol and parses the notification message 18 for the notification recipients.

Upon identifying the notification recipients from the notification message 18, the notification process 12 accesses the subscriber LDAP directory 30 in step 54 to determine whether the notification recipients are valid notification subscribers. If the notification recipients are valid notification subscribers, the notification-process 12 accesses the AP directory 30 in step 56 for the subscriber notification preferences 40 and all parameters associated with the device protocols to enable notification to the identified user device 24. If any notification recipient is not a valid notification subscriber, the process is dropped with respect to that notification recipient.

The notification process 12 parses the notification preferences 40 in step 58, and generates the notification delivery messages 28 for each notification subscriber in step 60. In particular, the notification process 12 determines for each notification device 24 the corresponding destination address 42, determines the message destination address for the corresponding secondary mailbox based on the selected device, and attaches the selected notification information 46 based on the selected device. Typically the notification process 12 will access a local table that identifies the SMTP destination address for each offset secondary mailboxes 22. The notification process 12 then sends the notification delivery messages 28 to the secondary mailboxes 22 in step 62.

As described above, the external notification source 20b may independently generate and output its own notification delivery message 28' in accordance with steps 60 and 62, where the external notification source 20b may be configured for accessing its own subscriber information 40.

Each notification delivery process 14 periodically polls its corresponding secondary mailbox 22 according to IMAP protocol, and in step 64 obtains its corresponding received notification delivery message 28 and parses the notification delivery message 28 for the destination address information 42 and the notification information 46. The notification delivery process 14 then delivers the supplied notification 46 to the corresponding associated device server 26 according to the device server protocol in step 66. For example, the notification delivery process 14a would send an e-mail message for transmission by the SMTP server 26a that specifies the destination address 42a of the e-mail client 24a and the notification information 46a as an attachment to the e-mail. The notification delivery process 14b, however, would send an SMS message to the SMS message server 26b that specifies the destination address 42b of the cellphone 24b and the text based notification information 46b for display on the subscribers cellphone 24b. The device server 26 would then send the notification message in step 68 to the corresponding subscriber device 24 according to the device specific protocol.

If notification to a device 24 should fail, the notification delivery process 14 schedules and performs any number of retries to the device 24. For example, the information about the message and the subscriber that still needs to be notified may be written to disk, plus the time at which the next retries should occur. Hence, each delivery process 14 processes any new incoming IMAP messages, and processes any needed retries.

Figure 4A:
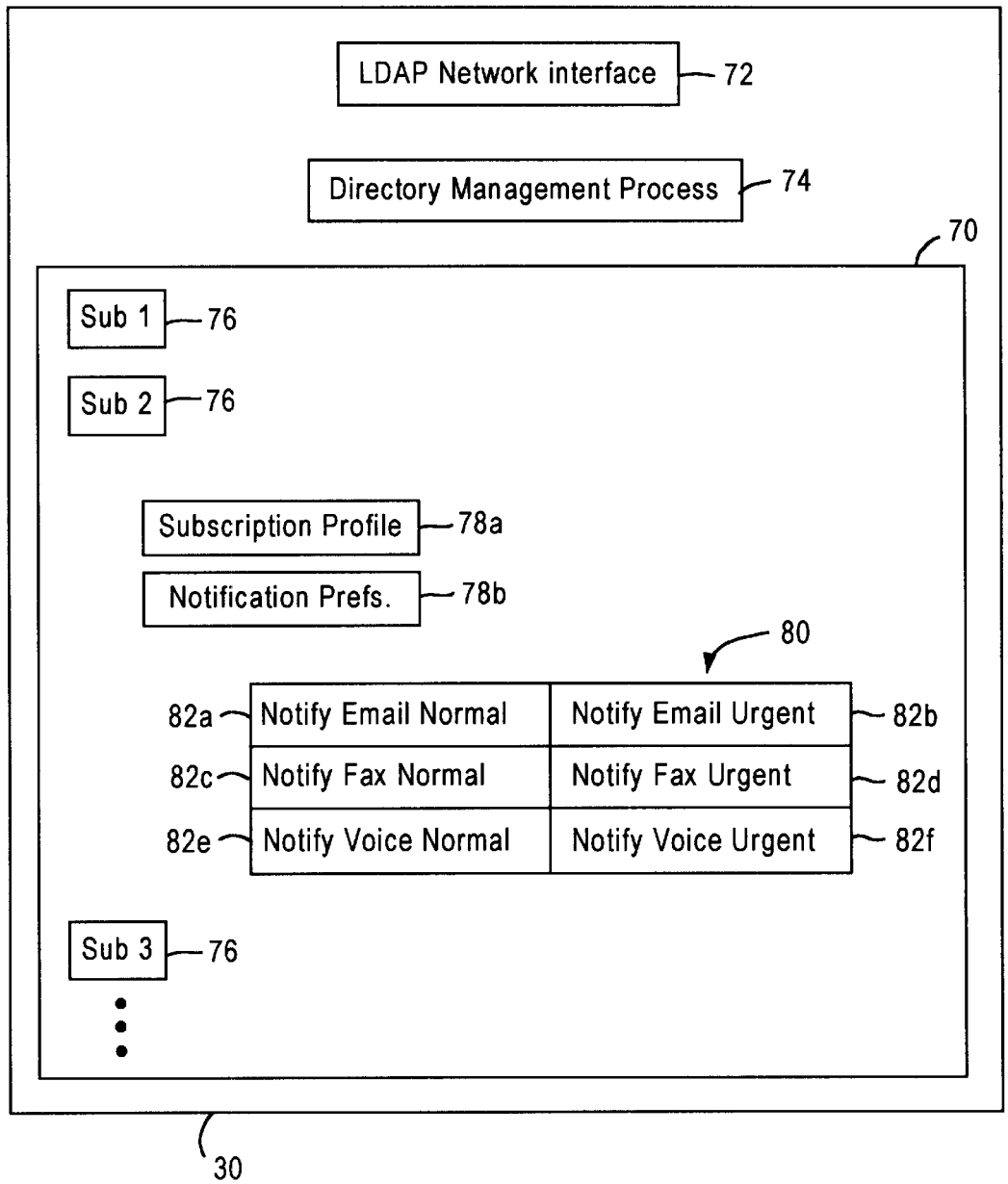
FIGS. 4A and 4B are diagrams summarizing the subscriber directory of FIG. 1, configured for storing subscriber notification preference information, according to an embodiment of the present invention.
Figure 4B:
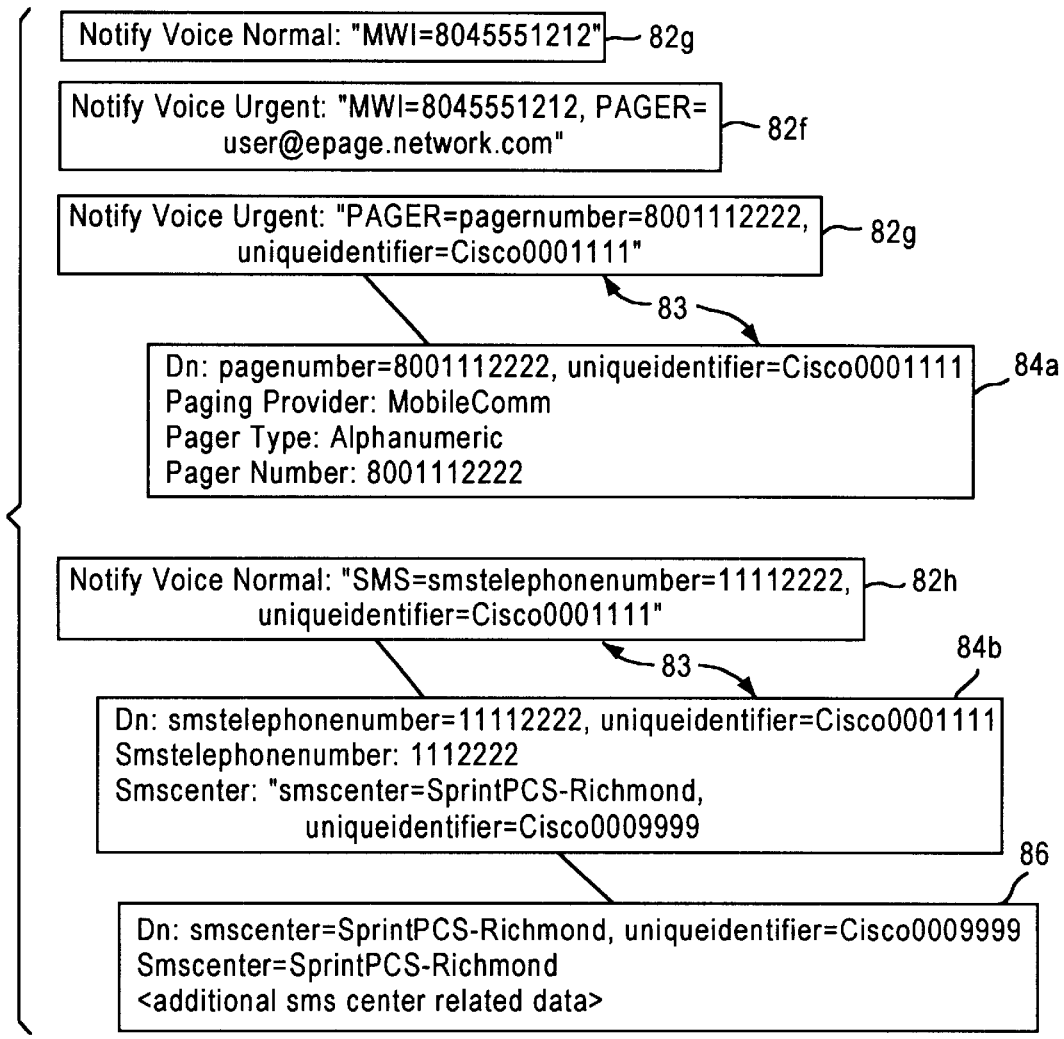

FIGS. 4A and 4B are diagrams summarizing the storage of subscriber notification preference information using a hierarchal structure of multiple object classes according to an embodiment of the present invention. In particular, FIG. 4A is a diagram illustrating the subscriber directory 30 of FIG. 1 according to an embodiment of the present invention. The subscriber directory 30 is implemented as a directory-based server configured for accessing and storing subscriber attributes on a tangible medium 70, for example a hard disk, arranged as a directory on a subscriber specific basis. In particular, the subscriber directory 30 includes an open protocol network interface 72, for example an LDAP network interface, configured for receiving requests across an IP network according to LDAP protocol, and outputting responses to the, received requests.

The subscriber directory 30 also includes a directory management process 74 configured for managing the storage and retrieval of subscriber information from the storage medium 70. In particular, the directory management process 74 is configured for establishing a directory 76 (i.e., folder) for each subscriber, and subdirectories 78 (i.e., subfolders) within each directory 76 for organized storage of subscriber attributes. For example, the directory management process 74 is configured for storing within the subscriber directory 76 a subscription profile subdirectory 78a that specifies subscriber-specific information, related to subscription services, for example subscriber identity, password, etc. The directory management process 74 also is configured for storing within the subscriber directory 76 a notification preferences directory 78b for storage of subscriber notification preference information 80. In particular, the notification preferences directory 78b is configured by the directory management process 74 for storing notification attributes 82 for respective notification types. For example, the subscriber notification preference information 80 includes: notification attributes 82a and 82b configured for storing notification device information if a normal priority or urgent priority e-mail is received for the notification subscriber; notification attributes 82c and 82d configured for specifying notification device information if a normal priority or urgent priority facsimile is received; and notification attributes 82e and 82f configured for specifying notification device information if a normal priority or urgent priority voice message is received, respectively.

The directory management process 74 stores the subscriber notification preference information 80 using a hierarchal structure of multiple object classes, illustrated in FIG. 4B, enabling an efficient management of relatively complex device information for different notification devices having respective protocols and service providers. In particular, the directory management process 74 stores the notification preferences using a hierarchal structure, where the top level notification record (i.e., the first object class of notification attributes) stores the first object class of notification attributes for the respective notification types as a list of notification attributes 82. Depending on the notification device, the service provider utilized by the notification device, and/or the protocol notification, the directory management process 74 may access multiple object classes to obtain sufficient information for generation of the notification message for the corresponding notification device.

For example, FIG. 4B illustrates different notification attributes having respective groupings of object classes. The first object class of the notification attribute 82g stores a notification device tag as a key pair ("MWI=8045551212") that specifies a message waiting indicator destination telephone number as the device address. Hence, the notification attribute 82g provides sufficient information for generation of the notification for the corresponding notification device: the notification process 12 of FIG. 1 merely needs to specify for the notification delivery process 14d the destination telephone number that needs to have its message waiting indicator illuminated.

The notification attribute 82f is another example of a first object class where two notification device tags (MWI= 8945551212, PAGER=user@page.network.com) are stored for notification via a message waiting indicator and a pager. Since the paging protocol uses SMTP, the pager notification device tag has sufficient information for generation of the notification message for the corresponding pager to receive the page as an e-mail client via the notification delivery process 14a. In addition, the notification attribute 82f illustrates that multiple device tags may be used to send a notification to respective multiple devices in response to the corresponding and, namely reception of an urgent voicemail message.

Instances may arise, however, where a notification subscriber may prefer to use a notification device that is not part of a local network. For example, a notification subscriber may use one service provider for voice messaging services, a second service provider for cellular and SMS based services, and a third service provider for paging services. In this case, more complex notification information may be necessary for generation of the notification message for the corresponding notification device. However, insertion of such complex notification information into a single notification attribute 82 may be impractical due to storage constraints, and may adversely affect the scalability of the subscriber directory system 30.

According to the disclosed embodiment, the directory management process 74 stores multiple object classes based on prescribed conditions of the notification device. In particular, the directory management 74, in response to determining that the associated device tag within the first object class of a notification attribute 82 has insufficient information for generation of the notification message for the corresponding notification device by the requesting resource, establishes an additional object class for storage of the necessary information for generation of the notification message. For example, the directory management process 74 adds to the device tag (PAGER=pagenumber=8001112222) of the notification attribute 82g a reference 83 to a second object class 84 of device attributes. The second object class 84 of device attributes includes details on the notification pager referenced in the notification attribute 82g that enables the requesting resource 12 (or 22e) to generate a notification message for generation of a page by the paging server 26e to the specified pager. Hence, the first object class 82 can be used for basic identification of a notification device for a corresponding notification type, and the second object class 84 can be used for storage of device attributes for the referenced notification device.

Instances may also arise where more detailed information is needed for generation of a notification to a referenced device according to a prescribed protocol, in addition to the device information specified within the second object class 84. For example, the notification attribute 82h has a device tag that specifies utilizing the short messaging service of a cellular phone. Although the notification attribute 82h references a second object class 84b of device attributes, additional information may be needed for the service provider 26b specified within the device attribute 84b to provide a notification to the notification device, for example SMS center-specific related data. In this case, the directory management process 74 stores a third object class of access attributes specifying information necessary for the service provider (e.g., SprintPCS-Richmond) to provide notification to the cellular device according to SMS protocol.

Hence, the directory management process 74 selectively adds additional object classes of information necessary for generation of a notification to a selected device, providing a schema that enables any notification device to be sufficiently described within the subscriber directory 30 with respect to its service provider, protocol etc. to enable a notification to be sent to the notification device, independent of the service provider or the protocol.

Figure 5:
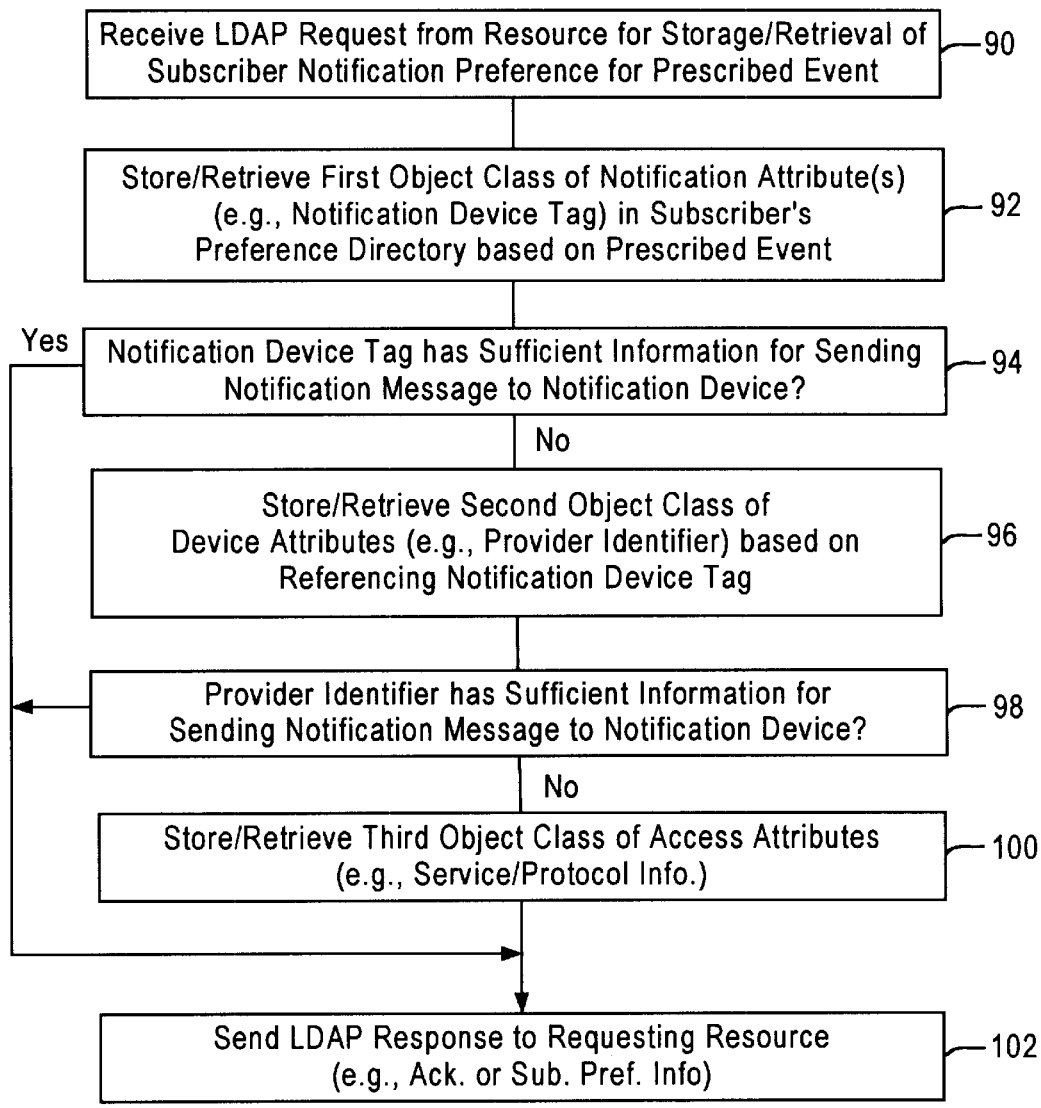
FIG. 5 is a diagram illustrating the method of managing the subscriber notification preference information in the subscriber directory according to an embodiment of the present invention.

FIG. 5 is a diagram illustrating the method of storing and retrieving subscriber notification preference information in the subscriber directory 30 according to an embodiment of the present invention. The steps described in FIG. 5 can be implemented as executable code stored on a computer readable medium (e.g. a hard disk drive, a floppy drive, a random access memory, a read only memory, an EPROM, a compact disc, etc.).

The directory management process 74 manages both the storage of the subscriber notification preference information, as illustrated in FIG. 4B, as well as the retrieval thereof in response to an LDAP request for selected subscriber notification preference information. In addition, the directory management process 74 may be implemented as executable routines within a single server, or distributed across multiple servers. In addition, the directory management process 74 and the subscriber information (illustrated as a storage medium 70) may be implemented on separate servers, and the subscriber information may be stored across distributed LDAP directories.

The method begins in step 90, where the LDAP network interface 72 receives a request from a resource, for example the notification process 12, for storage or retrieval of subscriber notification preference information for a selected subscriber for a prescribed event, for example reception of a normal priority voicemail. The directory management process 74 processes the request by accessing in step 92 the directory 76 for the identified subscriber and the subdirectory 78b for storage or retrieval of one of the first object class of notification attributes 82 based on the prescribed event. For example, the directory management process 74 stores the notification device tag within the appropriate notification attribute 82 during subscriber registration; alternately the directory management process 74 retrieves the notification attribute 82e based on the prescribed event corresponding to reception of a normal priority vocemail.

The directory management process 74 then determines in step 94 whether the notification device tag within the accessed-notification attribute 82 has sufficient information for sending a notification to the notification device specified within the accessed notification attribute 82. For example, the directory management process 74 may forward the retrieved first object class of notification attribute 82 to the requesting resource (e.g., the notification process 12) and wait a prescribed interval to determine whether the requesting resource needs additional information Alternately, the directory management process 74 may have accessible routines capable of parsing the notification attribute 82 for adequacy and completeness.

Assume the directory management process 74 determines in step 94 that the notification device tag from the retrieved first object class of notification attributes 82 does not have sufficient information to enable a notification process 12 to send a notification to a notification device. In this case, the directory management process 74 inserts in step 96 a reference within the notification device tag, and stores a second object class of device attributes 84 that describes in further detail the device attributes. As described above, the second object class of device attributes 84a may include sufficient paging information that enables the notification process 12 to initiate a notification to a paging device in communication with a different service provider. Hence, in the case of retrieval of subscriber notification preference information for a requesting resource, the directory management process 74 retrieves the information within the first object class of notification attribute 82g and the corresponding second object class of the device attribute 84a based on the reference 83 linking the first and second object classes.

The directory management process 74 then determines in step 98 whether the retrieved second object class of device attributes, for example the provider identifier, provides sufficient information for the notification process 12 to send a notification message to the identified notification device. For example, assume with respect to the second object class of device attributes 84b that an SMS message is to be sent to a cellphone: the directory management process 74 stores in step 100 the third object class of access attributes 86, for example service provider and/or notification protocol related information. Additional object classes may be successively accessed until sufficient information has been obtained to generate a notification for the identified notification device, at which point the network interface 72 sends a response in step 102 to the requesting resource.

According to the disclosed embodiment, a schema for storage of subscriber notification preference information using a hierarchal structure of object classes enables notification data to be more efficiently managed by logically separating the attributes based on notification preference, device, service provider, access protocol, etc. Hence, a single directory structure may be used for storage of notification information related to relatively simple notification devices such as e-mail and message waiting indicators (e.g., MWI lamp or, stutter dial tone), in conjunction with more complex notification schemes such as short messaging service and third party paging providers. Hence, the disclosed arrangement provides added flexibility and robust operation for unified messaging systems having notification schemes that transcend multiple notification devices across multiple open platform or proprietary protocols.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a subscriber directory of storing subscriber notification preference information, the method comprising:

storing a first object class of notification attributes for respective notification types, each notification attribute specifying for the corresponding notification type a corresponding notification device tag for notification to a corresponding notification device; and selectively storing a second object class of device attributes for at least one of the notification devices based on a prescribed condition of the at least one notification device, the second object class of device attributes specifying information necessary for generating a notification message to the corresponding notification device, the corresponding notification device tag for the at least one notification device referencing the corresponding second object class.

2. The method of claim 1, wherein the storing step includes storing, within the notification attributes of each notification type, a key pair that specifies a device type for the corresponding notification device and the corresponding notification device tag.

3. The method of claim 2, wherein the step of storing a key pair includes specifying within the notification device tag a device address having sufficient information for generation of the notification message for the corresponding notification device by an external resource.

4. The method of claim 3, wherein the storing step further includes storing a key pair that specifies at least one of a message waiting indicator destination telephone number for the device address and an e-mail address for the device address.

5. The method of claim 2, wherein the prescribed condition corresponds to the notification device tag having insufficient information for generation of the notification message for the corresponding notification device by an external resource.

6. The method of claim 5, wherein the notification types include at least one of an e-mail notification, a facsimile notification, a voicemail notification, a short messaging service notification, and a paging notification.

7. The method of claim 6, wherein each of the notification types is designated as one of a normal notification type and an urgent notification type.

8. The method of claim 5, wherein the selectively storing step includes specifying, within the second object class of device attributes, a provider identifier that specifies a service provider configured for communication with the at least one notification device, and a device identifier enabling the service provider to identify the at least one notification device.

9. The method of claim 8, further comprising selectively storing a third class of access attributes specifying information necessary for the service provider to provide a notification to the at least one notification device according to a specified protocol.

10. The method of claim 9, wherein the one notification device is configured for receiving a message by a Short Message Service (SMS) according to short message service protocol, the specifying step including specifying an SMS provider within the provider identifier and an SMS telephone number within the device identifier for the one notification device, the step of storing a third class of access attributes includes storing SMS center related data enabling the SMS provider to send the message to the one notification device according to short message service protocol.

11. A server configured for storing subscriber notification preference information in a subscriber directory, the server including:

an open-protocol network interface configured for receiving a request from a requesting resource according to an open-network protocol; and a directory management process configured for storing, according to the request, the subscriber notification preference information in the subscriber directory as a first object class of notification attributes for respective notification types, and selectively as a second object class of device attributes for at least one of the notification devices, each notification attribute specifying for the corresponding notification type a corresponding notification device tag for notification to a corresponding notification device, the directory management process selectively storing the second object class based on a prescribed condition of the at least one notification device, the second object class of device attributes specifying information necessary for generation of a notification message to the corresponding notification device, the corresponding notification device tag for the at least one notification device referencing the corresponding second object class.

12. The server of claim 11, wherein the directory management process is configured for storing, within the notification attributes of each notification type, a key pair that specifies a device type for the corresponding notification device and the corresponding notification device tag.

13. The server of claim 12, wherein the directory management process is configured for specifying within the notification device tag a device address having sufficient information for generation of the notification message for the corresponding notification device by the requesting resource.

14. The server of claim 13, wherein the directory management process stores within the key pair at least one of a message waiting indicator destination telephone number for the device address, and an e-mail address for the device address.

15. The server of claim 12, wherein the directory management process is configured for storing the second object class based on the notification device tag having insufficient information for generation of the notification message for the corresponding notification device.

16. The server of claim 15, wherein the notification types include at least one of an e-mail notification, a facsimile notification, a voice mail notification, a short messaging service notification, and a paging notification.

17. The server of claim 16, wherein each of the notification types is designated as one of a normal notification type and an urgent notification type.

18. The server of claim 15, wherein the directory management process is configured for specifying, within the second object class of device attributes, a provider identifier that specifies a service provider configured for communication with the at least one notification device, and a device identifier enabling the service provider to identify the at least one notification device.

19. The server of claim 18, wherein the directory management process is configured for selectively storing a third class of access attributes specifying information necessary for the service provider to provide a notification to the at least one notification device according to a specified protocol.

20. The server of claim 19, wherein the one notification device is configured for receiving a message by a Short Message Service (SMS) according to short message service protocol, the directory management process specifying an SMS provider within the provider identifier and an SMS telephone number within the device identifier for the one notification device, the directory management process storing SMS center related data within the third class of access attributes enabling the SMS provider to send the message to the one notification device according to short message service protocol.

21. A server configured for storing subscriber notification preference information in a subscriber directory, the server comprising:
   means for storing a first object class of notification attributes for respective notification types, each notification attribute specifying for the corresponding notification type a corresponding notification device tag for notification to a corresponding notification device; and
   means for selectively storing a second object class of device attributes for at least one of the notification devices based on a prescribed condition of the at least one notification device, the second object class of device attributes specifying information necessary for generating a notification message to the corresponding notification device, the corresponding notification device tag for the at least one notification device referencing the corresponding second object class.

22. The server of claim 21, wherein the storing means is configured for storing within the notification attributes of each notification type, a key pair that specifies a device type for the corresponding notification device and the corresponding notification device tag.

23. The server of claim 22, wherein the storing means is configured for specifying within the notification device tag a device address having sufficient information for generation of the notification message for the corresponding notification device by an external resource.

24. The server of claim 23, wherein the storing means is configured for storing a key pair that specifies at least one of a message waiting indicator destination telephone number for the device address and an e-mail address for the device address.

25. The server of claim 22, wherein the prescribed condition corresponds to the notification device tag having insufficient information for generation of the notification message for the corresponding notification device by an external resource.

26. The server of claim 22, wherein the notification types include at least one of an e-mail notification, a facsimile notification, a voicemail notification, a short messaging service notification, and a paging notification.

27. The server of claim 22, wherein each of the notification types is designated as one of a normal notification type and an urgent notification type.

28. The server of claim 22, wherein the selectively storing means is configured for includes specifying, within the second object class of device attributes, a provider identifier that specifies a service provider configured for communication with the at least one notification device, and a device identifier enabling the service provider to identify the at least one notification device.

29. The server of claim 22, further comprising means for selectively storing a third class of access attributes specifying information necessary for the service provider to provide a notification to the at least one notification device according to a specified protocol.

30. The server of claim 22, wherein the one notification device is configured for receiving a message by a Short Message Service (SMS) according to short message service protocol, the means for selectively storing the second object class configured for specifying an SMS provider within the provider identifier and an SMS telephone number within the device identifier for the one notification device, the means for selectively storing a third class of access attributes configured for storing SMS center related data enabling the SMS provider to send the message to the one notification device according to short message service protocol.

31. A computer readable medium having stored thereon sequences of instructions for storing subscriber notification preference information in a subscriber directory, the sequences of instructions including instructions for performing the steps of:

storing a first object class of notification attributes for respective notification types, each notification attribute specifying for the corresponding notification type a corresponding notification device tag for notification to a corresponding notification device; and selectively storing a second object class of device attributes for at least one of the notification devices based on a prescribed condition of the at least one notification device, the second object class of device attributes specifying information necessary for generating a notification message to the corresponding notification device, the corresponding notification device tag for the at least one notification device referencing the corresponding second object class.

32. The medium of claim 31, wherein the storing step includes storing, within the notification attributes of each notification type, a key pair that specifies a device type for the corresponding notification device and the corresponding notification device tag.

33. The medium of claim 32, wherein the step of storing a key pair includes specifying within the notification device tag a device address having sufficient information for generation of the notification message for the corresponding notification device by an external resource.

34. The medium of claim 33, wherein the storing step further includes storing a key pair that specifies at least one of a message waiting indicator destination telephone number for the device address and an e-mail address for the device address.

35. The medium of claim 32, wherein the prescribed condition corresponds to the notification device tag having insufficient information for generation of the notification message for the corresponding notification device by an external resource.

36. The medium of claim 35, wherein the notification types include at least one of an e-mail notification, a facsimile notification, a voicemail notification, a short messaging service notification, and a paging notification.

37. The medium of claim 36, wherein each of the notification types is designated as one of a normal notification type and an urgent notification type.

38. The medium of claim 35, wherein the selectively storing step includes specifying, within the second object class of device attributes, a provider identifier that specifies a service provider configured for communication with the at least one notification device, and a device identifier enabling the service provider to identify the at least one notification device.

39. The medium of claim 38, further comprising instructions for performing the step of selectively storing a third class of access attributes specifying information necessary for the service provider to provide a notification to the at least one notification device according to a specified protocol.

40. The medium of claim 39, wherein the one notification device is configured for receiving a message by a Short Message Service (SMS) according to short message service protocol, the specifying step including specifying an SMS provider within the provider identifier and an SMS telephone number within the device identifier for the one notification device, the step of storing a third class of access attributes includes storing SMS center related data enabling the SMS provider to send the message to the one notification device according to short message service protocol.

* * * * *

UNITED STATES PATENT AND TRADEMARK OFFICE
CERTIFICATE OF CORRECTION

PATENT NO.   : 6,560,318 B1                                          Page 1 of 3
DATED        : May 6, 2003
INVENTOR(S)  : Speilman et al.

It is certified that error appears in the above-identified patent and that said Letters Patent is hereby corrected as shown below:

Column 13,
Line 65, replace "storing" with -- storing according to LDAP protocol --.

Column 14,
Line 4, replace "selectively storing" with -- selectively adding according to LDAP protocol --;
Lines 10-11, replace "the corresponding notification device tag" with -- the selectively adding including inserting, into the corresponding notification device tag --;
Lines 11-12, replace "device referencing the corresponding second object class" with -- device, a reference for referencing the corresponding second object class, the selectively adding of the second object class providing a hierarchal schema of multiple object classes; and
 retrieving according to LDAP protocol the first object class of notification attributes and the second object class of device attributes in response to at least one request from a requesting device, and outputting the first object class of notification attributes and second object class of device attributes via and IP-based connection to the requesting device --;
Line 40, replace "selectively storing" with -- selectively adding --.

Column 15,
Line 3, replace "directory as a" with -- directory according to LDAP protocol as a --;
Line 5, replace "selectively as" with -- selectively adding --;
Line 11, replace "selectively storing" with -- selectively adding --;
Line 16, replace "the corresponding" with -- the directory management process inserting into the corresponding --;
Line 17, replace "device referencing" with -- device a reference for referencing --;
Line 18, replace "second object class." with -- second object class to provide a hierarchal schema of multiple object classes;
wherein the directory management process is configured for retrieving according to LDAP protocol the first object class of notification attributes and the second object class of device attributes in response to at least one request from a requesting resource, the open-protocol network interface configured for outputting the first object class of notification attributes and second object class of device attributes via an IP-based connection to the requesting resource. --;
Line 36, replacing "for storing" with -- for adding --.

Column 16,
Line 7, replace "storing a" with -- storing according to LDAP protocol a --;
Line 12, replace "selectively storing a" with -- selectively adding according to LDAP protocol a --;

UNITED STATES PATENT AND TRADEMARK OFFICE
CERTIFICATE OF CORRECTION

PATENT NO. : 6,560,318 B1
DATED : May 6, 2003
INVENTOR(S) : Speilman et al.

It is certified that error appears in the above-identified patent and that said Letters Patent is hereby corrected as shown below:

Column 16 (cont'd),
Line 18, replace "the corresponding notification" with -- the selectively adding including inserting, into the corresponding notification --;
Lines 19-20, replace "notification device referencing" with -- notification device, a reference for referencing --;
Line 20, replace "second object class." with -- second object class, the selectively adding of the second object class providing a hierarchal schema of multiple object classes; and
   means for retrieving according to LDAP protocol the first object class of notification attributes and the second object class of device attributes in response to at least one request from a requesting device, and outputting the first object class of notification attributes and second object class of device attributes via an IP-based connection to the requesting device. --;
Line 22, replace "storing within" with -- storing, within --;
Line 41, replace "claim 22" with -- claim 25 --;
Line 45, replace "claim 22" with -- claim 26 --;
Line 48, replace "claim 22" with -- claim 25 -- and replace "selectively storing" with -- selectively adding --;
Line 49, replace "for includes specifying" with -- for specifying --;
Line 55, replace "claim 22" with -- claim 28 --;
Line 60, replace "claim 22" with -- claim 29 --;
Line 63, replace "selectively storing" with -- selectively adding --.

Column 17,
Line 9, replace "storing" with -- storing according to LDAP protocol --;
Line 13, delete "and";
Line 14, replace "selectively storing" with -- selectively adding according to LDAP protocol --;
Line 20, replace "the corresponding" with -- the selectively adding including inserting, into the corresponding --;
Line 21, replace "device referencing" with -- device a reference for referencing --;
Line 22, replace "second object class." with -- second object class, the selectively adding of the second object class providing a hierarchal schema of multiple object classes; and
retrieving according to LDAP protocol the first object class of notification attributes and the second object class of device attributes in response to at least one request from a requesting device, and outputting the first object class of notification attributes and second object class of device attributes via an IP-based connection to the requesting device. --.

UNITED STATES PATENT AND TRADEMARK OFFICE
CERTIFICATE OF CORRECTION

PATENT NO. : 6,560,318 B1
DATED : May 6, 2003
INVENTOR(S) : Speilman et al.

It is certified that error appears in the above-identified patent and that said Letters Patent is hereby corrected as shown below:

Column 18,
Lines 13-14, replace "selectively storing" with -- selectively adding --.

Signed and Sealed this

Seventh Day of September, 2004

JON W. DUDAS
*Director of the United States Patent and Trademark Office*